Figure 4:
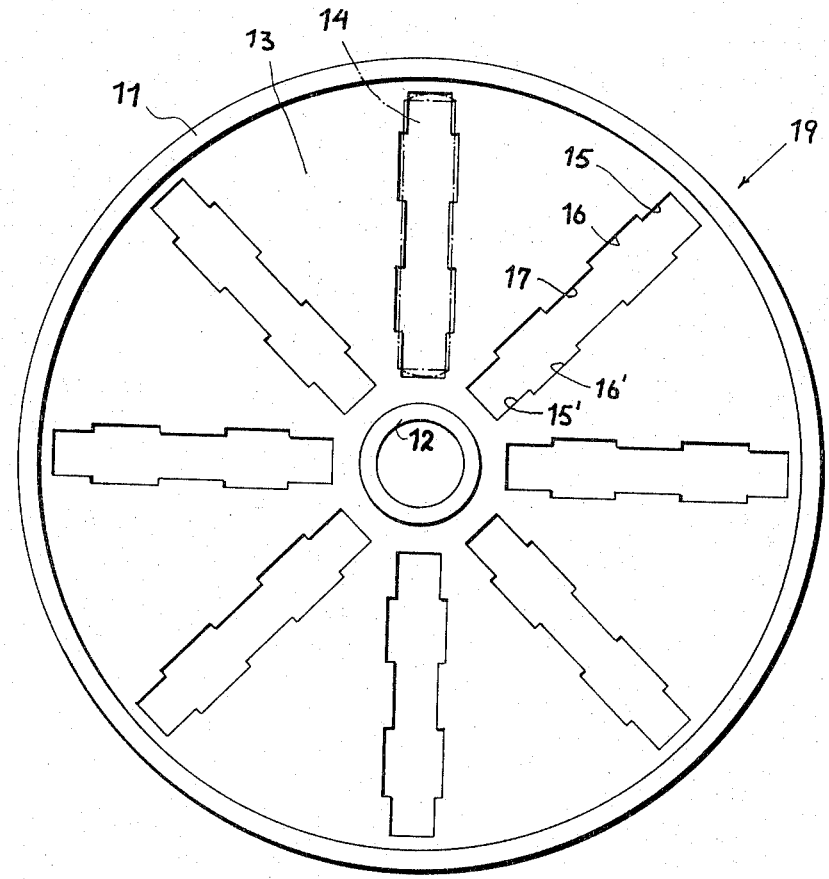

April 18, 1967     G. SCHAEFFLER     3,314,738
CAGE FOR ROLLER BEARING
Filed May 22, 1963     2 Sheets-Sheet 1
FIG.1
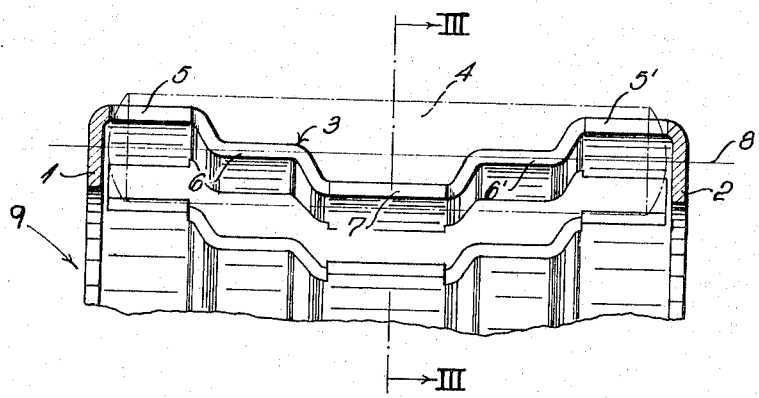
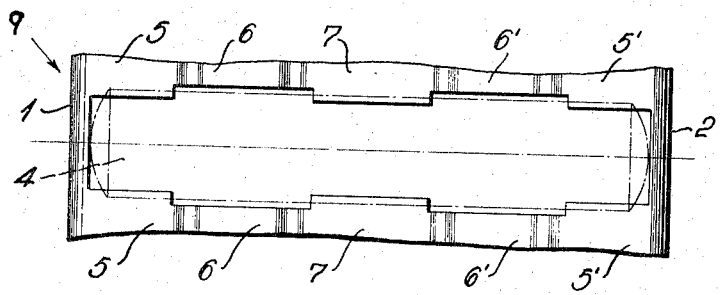
Fig. 2
FIG.3
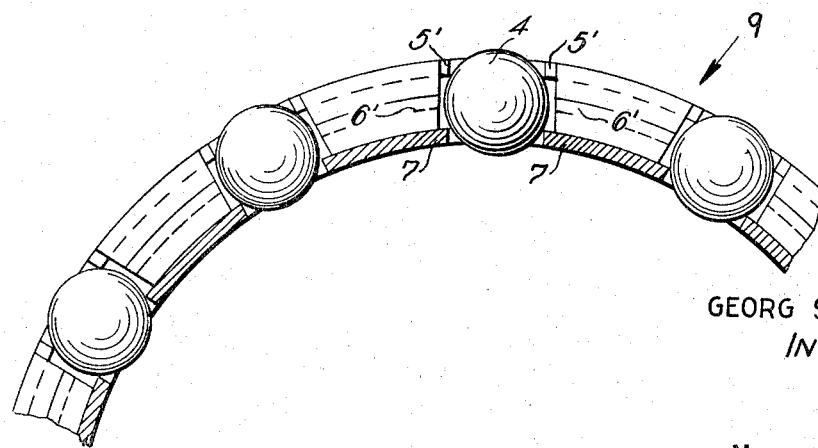
GEORG SCHAEFFLER
INVENTOR.
BY Mestern, Ross & Mestern April 18, 1967  G. SCHAEFFLER  3,314,738
CAGE FOR ROLLER BEARING
Filed May 22, 1963  2 Sheets-Sheet 2

GEORG SCHAEFFLER
INVENTOR.

BY Mestern, Ross & Mestern

United States Patent Office 3,314,738
Patented Apr. 18, 1967

3,314,738
CAGE FOR ROLLER BEARING
Georg Schaeffler, Herzogenaurach, near Nurnberg, Germany, assignor to Industriewerk Schaeffler o.H.G., Herzogenaurach, near Nurnberg, Germany, a corporation of Germany
Filed May 22, 1963, Ser. No. 282,426
Claims priority, application Germany, May 24, 1962, J 10,561
3 Claims. (Cl. 308—217)

My present invention relates to bearings of the roller or needle type in which a plurality of substantially cylindrical bearing elements are rotatably received in slots of a suitable cage.

The cages used in such bearings are usually formed with two coaxial rings which are interconnected by equispaced webs defining roller-receiving slots, the rings constituting abutments for the ends of the rollers. These rings may have the same diameter and be axially spaced from each other, as in the case of a journal bearing, or they may be of different diameters and concentrically arranged, as in the case of a thrust bearing. In either case it is advantageous to shape the webs in undulating fashion, e.g., substantially trapezoidally, to provide roller-engaging edge portions on opposite sides of a median cylindrical or plane surface which is defined by the individual axes of the several rollers or needles as the cage supporting them rotates about the axis of its rings. A thrust bearing of this general description has been disclosed in commonly assigned application Ser. No. 259,323, filed Feb. 18, 1963, by Rudolph Jahn, now Patent No. 3,240,542.

Difficulties have arisen heretofore in the designing of web profiles in a manner insuring dependable guidance for the cylindrical bearing elements and retention thereof within the slots of the cage. With trapezoidal webs, for example, the sloping legs of the trapezoid must be given a generally elliptical concave curvature if more than point contact between these legs and the rollers is desired. Such a curvature, on the other hand, is difficult to establish with the necessary accuracy in the mass production of bearing cages.

It is, therefore, the general object of my present invention to provide a cage for bearing elements in which the slot-forming webs have a simpler shape than in prior structures of this type yet wherein the advantages of positive guidance with extended contact between the web edges and the roller periphery are maintained, this positive guidance enabling the cage and its rollers to be marketed as a unit without the need for laborous insertion of the rollers into the slots on an assembly site.

A more specific object of this invention is to provide a cage of this description which can be made in a single piece, e.g., from sheet steel, by known mass-production techniques.

These objects are realized, in accordance with the instant invention, by forming each pair of slot-forming webs of the cage with two or more pairs of edges which embrace the associated roller or needle on opposite sides of the aforementioned median surface defined by the rotating roller axis, the separation of the edges of each pair being therefore less than the roller diameter, and with at least one pair of further edges which lie substantially within that median surface and are separated by a distance slightly greater than the roller diameter so that the roller is guided between these latter edges with at least linear contact whereby both the roller and the cage will wear less rapidly than in prior structures.

Figure 5:
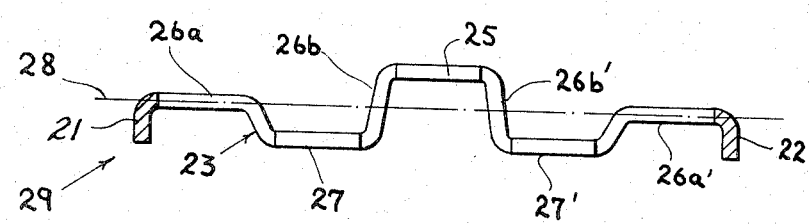

The invention will be described hereafter in greater detail with reference to the accompanying drawing in which:

FIG. 1 is an axial sectional view of a cage according to the invention adapted to form part of a journal bearing;
FIG. 2 is a fragmentary plan view of the cage shown in FIG. 1;
FIG. 3 is a cross-sectional view taken on line III—III of FIG. 1;
FIG. 4 is a plan view of a different cage embodying the invention, designed for a thrust bearing; and
FIG. 5 shows in fragmentary axial section a modified bearing cage of the journal type illustrated in FIGS. 1-3.

The cage 9 shown in FIGS. 1–3 comprises a pair of sheet-metal rings 1, 2 which are coaxially spaced apart and interconnected by a plurality of axially extending webs 3. The spaces between adjacent webs 3 form slots or pockets adapted to receive cylindrical bearing rollers 4 respectively assigned to them. The axes 8 of the rollers 4 lie on an imaginary cylinder surface which bisects the depth of the webs 3 and within which the adjoining webs form two pairs of parallel edges 6, 6' whose separation is barely greater than the diameter of the roller 4 positioned between them. Two other edge pairs 5 and 5' on the outer periphery of the bearing body 9, adjacent the rings 1 and 2, engage the roller periphery from without whereas a further pair of edges 7 along the inner roller periphery, located at the center of the webs, bear upon the roller from within. The roller 4, whose ends are closely spaced from the rings 1 and 2, is thus bracketed at four points of its circumference by the edges 5, 5' and 7 (as best seen in FIG. 3) and is thereby securely held within its slot, the guiding edges 6 and 6' at the same time preventing any undue wear of the webs and the roller by contacting the latter over an extended part of its median zone. It will be understood that the edges 6 and 6' may be given a slight concavity, substantially conforming to the curvature of the roller periphery, yet such curving may also ensue automatically in prolonged use of the bearing.

It will be noted that each web 3 is of stepped configuration and includes several strip portions bounded by the mutually parallel lateral edges 5, 6, 7, 6', 5', i.e., a first strip portion (edges 7) on one side of the median cylinder surface defined by axes 8, a pair of second strip portions (edges 5, 5') on the opposite side of that median surface and a third strip portion (edges 7) in that surface.

The bearing cage 19 shown in FIG. 4 is of substantially flat annular configuration, its outer and inner peripheries being defined by two concentric rings 11 and 12 which are interconnected by equispaced webs 13. The webs 13 have substantially the same profiles as the webs 3 in the preceding embodiment and define slots bounded by raised edge pairs 15 and 15' on one side of the median plane of the cage body, a depressed edge pair at the center of the slot and pairs of more widely spaced parallel edges 16 and 16' intermediate the edges 17 and 15, 15', all as previously described with reference to FIGS. 1–3. The slots between the webs 13 are occupied by rollers 14 projecting peripherally beyond the edges 15, 15' and 17, even as the rollers 4 project beyond edges 5, 5' and 7 as best seen in FIG. 1.

Another cage adapted for use in a journal bearing has been illustrated at 29 in FIG. 5. This cage is generally similar to cage 9 of FIGS. 1 and 3, except that the guiding edges 26a, 26a' of its web 23 on the level of the roller axis 28 are disposed next to the rings 21, 22 whereas the inner and outer retaining edges 27, 27' and 25 are positioned between these guiding edges and are in turn interconnected by sloping web portions 26b, 26b'. From this showing it will be apparent that the guiding edges parallel to the roller axes need not always be interposed between the retaining edges located on opposite sides of the median surface of the cage even though, in practice, the arrangement illustrated in FIGS. 1–3 has certain advantages in that the rollers are positively held at their ends as well as in the middle and are better protected by the end rings of the cage. Naturally, modifications similar to the one illustrated in FIG. 5 can also be used in a thrust bearing of the type shown in FIG. 4.

Although the invention has been described and illustrated with specific reference to journal bearings and thrust bearings, it is also applicable to other types of bearings such as, for example, axial bearings of the general character disclosed in commonly assigned application Ser. No. 258,948 filed Feb. 4, 1963, by Werner Jacob and Walter Kaiser, now abandoned. My invention is, accordingly, not limited to the specific modes of realization disclosed but may be altered in its structural details without departing from the spirit and scope of the invention as defined in the appended claims.

I claim:

1. A cage for supporting a plurality of substantially cylindrical bearing elements, comprising a pair of coaxial rings and a plurality of equispaced webs interconnecting said rings, said webs forming slots between them for receiving said bearing elements with their cylinder axes defining a common median surface upon rotation of said bodies about the axes of said rings, said webs and rings being formed unitarily from thin sheet metal, said webs being of stepped configuration and including first strip portions parallel to said median surface and disposed on one side thereof, second strip portions parallel to said median surface and disposed on the opposite side thereof, and third strip portions in said median surface, each of said strip portions having a length in the axial direction of adjoining bearing elements substantially greater than the thickness of said strip portions, each of said slots being bounded by mutually parallel lateral edges of said strip portions of adjoining webs including at least one pair of edges of said first strip portions spaced apart by less than the diameter of said bearing elements for engaging the surface of one such element from said one side, at least one pair of edges of said second strip portions spaced apart by less than said diameter for engaging the surface of said one element from said opposite side, and at least one pair of edges of said third strip portions in said median surface spaced apart by a distance slightly greater than said diameter for guiding said one element within the slot.

2. A cage as defined in claim 1 wherein each web comprises a single first strip portion, said second and third strip portions being duplicated on opposite sides of said first strip portion.

3. A cage as defined in claim 2 wherein said third strip portions are disposed between said first strip portion and said second strip portions.

References Cited by the Examiner

UNITED STATES PATENTS

| 2,950,151 | 8/1960 | Clark et al. | 308—217 |
| 3,028,204 | 4/1962 | Schaeffler | 308—217 |
| 3,114,960 | 12/1963 | Einaudi | 308—217 |

FOREIGN PATENTS

| 670,183 | 4/1952 | Great Britain. |
| 1,023,932 | 2/1958 | Germany. |

MARTIN P. SCHWADRON, *Primary Examiner.*

DAVID J. WILLIAMOWSKY, *Examiner.*

R. F. HESS, *Assistant Examiner.*